(12) United States Patent
Tolley et al.

(10) Patent No.: US 11,958,400 B1
(45) Date of Patent: Apr. 16, 2024

(54) CARGO STRAP WITH LOAD STATUS TRANSMITTER

(71) Applicant: Tolley Technologies, LLC, Belle Fourche, SD (US)

(72) Inventors: Cory L. Tolley, Belle Fourche, SD (US); Darcy N. Tolley, Belle Fourche, SD (US); Daphne M. Johnson, Spearfish, SD (US); Paul E. Johnson, Spearfish, SD (US)

(73) Assignee: Tolley Technologies, LLC, Queen Creek, AZ (US)

( * ) Notice: Subject to any disclaimer, the term of this patent is extended or adjusted under 35 U.S.C. 154(b) by 0 days.

(21) Appl. No.: 18/220,158

(22) Filed: Jul. 10, 2023

Related U.S. Application Data (60) Provisional application No. 63/383,645, filed on Nov. 14, 2022.

(51) Int. Cl.
*B60P 7/08* (2006.01)

(52) U.S. Cl.
CPC .................. *B60P 7/0861* (2013.01)

(58) Field of Classification Search
CPC .................................................... B60P 7/0861
USPC .......................................................... 410/96
See application file for complete search history.

(56) References Cited

U.S. PATENT DOCUMENTS

| | | | | |
|---|---|---|---|---|
| 8,847,758 B2* | 9/2014 | Eide | ........................ | G01L 5/102 |
| | | | | 340/568.1 |
| 10,315,555 B2* | 6/2019 | Bruhn | ..................... | G01G 19/12 |
| 10,328,841 B2* | 6/2019 | Bika | ........................ | H04W 4/70 |
| 10,328,842 B2* | 6/2019 | McNally | ................ | B60P 7/0861 |
| 10,625,658 B2* | 4/2020 | Taylor | ..................... | G08B 13/06 |
| 11,370,348 B2* | 6/2022 | Ehnimb | ................ | G08B 21/182 |
| 2013/0162420 A1* | 6/2013 | Stoddard | ............... | B60P 7/0861 |
| | | | | 340/425.5 |
| 2018/0319312 A1* | 11/2018 | Cooper | ..................... | G01L 5/10 |
| 2019/0001863 A1* | 1/2019 | Taylor | ..................... | H04W 4/70 |
| 2021/0025770 A1* | 1/2021 | Sanders | .................. | G01L 5/045 |

(Continued)

FOREIGN PATENT DOCUMENTS

| CN | 101486329 A | 7/2009 |
|---|---|---|
| DE | 102018009012 A1 * | 5/2020 |

(Continued)

OTHER PUBLICATIONS

Wu et al., "Smart Ratchet Tie-Down Straps for Monitoring Cargo Safety", SMSI 2020 Conference Sensor and Measurement Science International, pp. 240-241, 2020, 2 pages.

(Continued)

*Primary Examiner* — Hilary L Gutman
(74) *Attorney, Agent, or Firm* — FISHER BROYLES, LLP (57) ABSTRACT

A strap system comprising a first strap extending between a first end and a second end. The first end is connected to a first attachment mechanism. The strap system further comprises a second strap extending between a third end and a fourth end. The fourth end is connected to a second attachment mechanism. The strap system comprises a load transmission device connected to the second end of the first strap and to the third end of the second strap. The load transmission device is arranged to transmit a signal in response to a tension force in the first and second straps falling below a threshold force.

17 Claims, 2 Drawing Sheets

(56) References Cited

U.S. PATENT DOCUMENTS

2022/0242302 A1 * 8/2022 Goetz .................. B60P 7/0869

FOREIGN PATENT DOCUMENTS

DE       102019211419 A1 * 2/2021 ............ B60P 7/0861
WO    WO-2011003242 A1 * 1/2011 ............ B60P 7/0861

OTHER PUBLICATIONS

BCM Sensor Technologies, "Wireless Tension Monitoring Ratchet Tie-Down Straps," Model SR5716/SR5796 Datasheet, retrieved on Feb. 5, 2024, from https://www.bcmsensor.com/wp-content/uploads/2020/04/200415_SR5716-SR5796_Wireless_Ratchet_Tie-Down_Straps.pdf, 4 pages.

* cited by examiner

CARGO STRAP WITH LOAD STATUS TRANSMITTER

CROSS REFERENCE TO RELATED APPLICATIONS

The present application claims priority from and is a non-provisional application of U.S. Provisional Application No. 63/383,645 entitled "Cargo Strap With Loads Status Transmitter" filed Nov. 14, 2022, the entire contents of which is herein incorporated by reference for all purposes.

BACKGROUND

Loose cargo may be secured with a tensioned strap. During transportation, the tension in the strap may be released, for example, due to shifting of the cargo and/or mechanical failure of the strap itself. Loosened straps may lead to damage of the cargo and/or loss of the cargo, for example, if it is being transported on an open trailer. New straps and/or methods of notifying an operator of the loss of tension are needed to mitigate damage to and/or loss of cargo.

BRIEF SUMMARY

One aspect of the disclosure provides for a strap system comprising a first strap extending between a first end and a second end. The first end is connected to a first attachment mechanism. The strap system further comprises a second strap extending between a third end and a fourth end. The fourth end is connected to a second attachment mechanism. The strap system comprises a load transmission device connected to the second end of the first strap and to the third end of the second strap. The load transmission device is arranged to transmit a signal in response to a tension force in the first and second straps falling below a threshold force. The load transmission device may include a switch arranged to change state when a tensile force in the first and second straps falls below the threshold force. The load transmission device may include a power storage device and a wireless transmitter. The power storage device may supply power to the wireless transmitter to transmit the signal in response to the switch changing state. The strap system may further comprise a charging apparatus that charges the power storage device. The load transmission device may include a spring arranged to control the threshold force. The signal may be a first signal. The load transmission device may be arranged to transmit a second signal in response to the tension force in the first and second straps remaining above the threshold force. The load transmission device may include a switch mechanism, a plate, and a spring having a spring force biasing the plate toward the switch mechanism. The tension force in the first and second straps may be less than a force of the spring the spring force holds the plate and the switch mechanism in a first state. When the tension force in the first and second straps is greater than a force of the spring, the tension force may hold the plate and the switch mechanism in a second state. The signal may be a first signal transmitted in response to the switch mechanism entering the first state. The load transmission device may transmit a second signal in response to the switch mechanism entering the second state. The strap system may further comprise a computing device arranged to receive the first and second signals and to display a corresponding status of the load transmission device. The strap system may further comprise a strap tensioning mechanism that applies and releases tension in the first and second straps.

Another aspect of the disclosure provides for a tensioning system comprising a strap apparatus and, a load transmission device coupled to the strap apparatus and including a switch mechanism, a plate, and a spring. The spring has a spring force arranged to force the plate toward the switch mechanism. When a tension force in the strap apparatus is less than the spring force the spring force holds the plate and the switch mechanism in a first state. When the tension force in the strap apparatus is greater than the spring force, the tension force holds the plate and the switch mechanism in a second state. The load transmission device may further comprise a transmitter arranged to transmit a first signal when the switch mechanism is in the first state and to transmit a second signal when the switch mechanism is in the second state. The tensioning system may further comprise a computing device arranged to receive the first and second signals and to display a corresponding status of the load transmission device. The strap apparatus may include a first and a second strap each attached to the load transmission device. The tensioning system may further comprise a strap tensioning mechanism that applies and releases tension in the strap apparatus.

Another aspect of the disclosure provides for a method of monitoring tension in a strap apparatus. The method comprises attaching the strap apparatus to a structure, applying a tension force to the strap apparatus via a tensioning mechanism, transmitting a first signal from the strap apparatus in response to the tension at a force less than a predetermined threshold force, and transmitting a second signal from the strap apparatus in response to the tension at a force greater than the predetermined threshold force. The method may further comprise receiving by a computing device the first and the second signals and displaying a corresponding status of the tension in the strap apparatus. The strap apparatus may include one or more straps. The load transmission device may be coupled to the one or more straps, the load transmission device including a switch mechanism, a plate, and a spring having a spring force biasing the plate toward the switch mechanism. When a tension force in the one or more straps is less than a force of the spring, the spring force may hold the plate and the switch mechanism in a first state. When the tension force in the one or more straps is greater than a force of the spring, the tension force may hold the plate and the switch mechanism in a second state. The load transmission device may further comprise a transmitter arranged to transmit the first signal when the switch mechanism is in the first state and to transmit the second signal when the switch mechanism is in the second state. The strap apparatus may further comprise a strap tensioning mechanism that applies and releases tension in the one or more straps.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

The present disclosure relates to a tensioned strap apparatus that includes a wireless notification mechanism that provides a notification to a computing device (e.g., a user device) of a loss of tension in the strap. In some embodiments the tensioned strap apparatus notifies the computing device after the tension in the strap falls below a threshold tension.

Figure 1A:
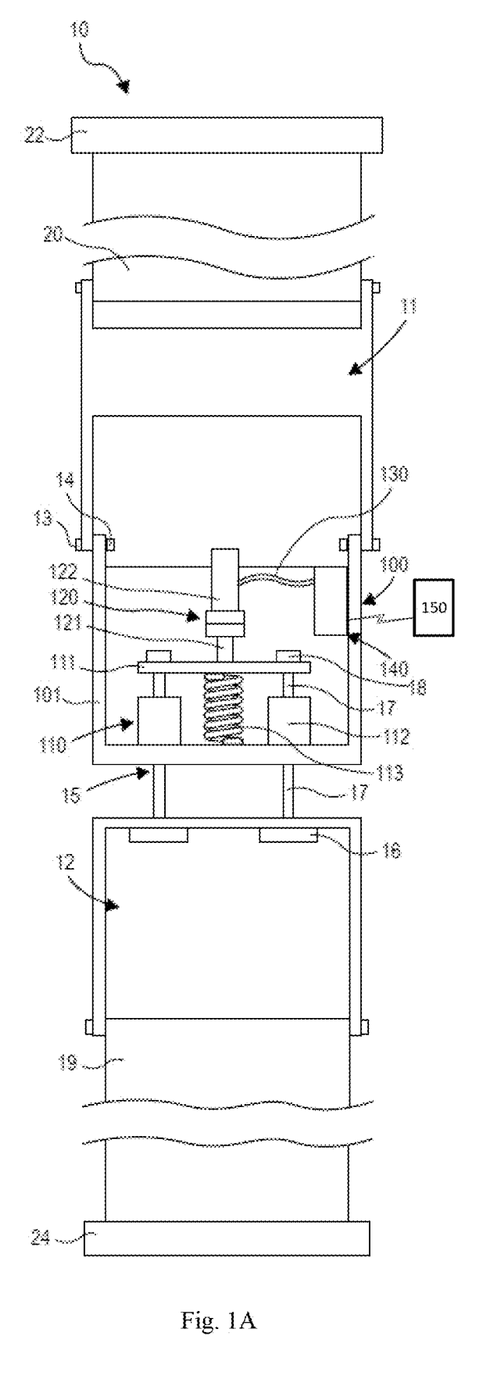
FIG. 1A depicts a simplified view of an example tensioning system in an "off" position according to one embodiment of the disclosure.
Figure 1B:
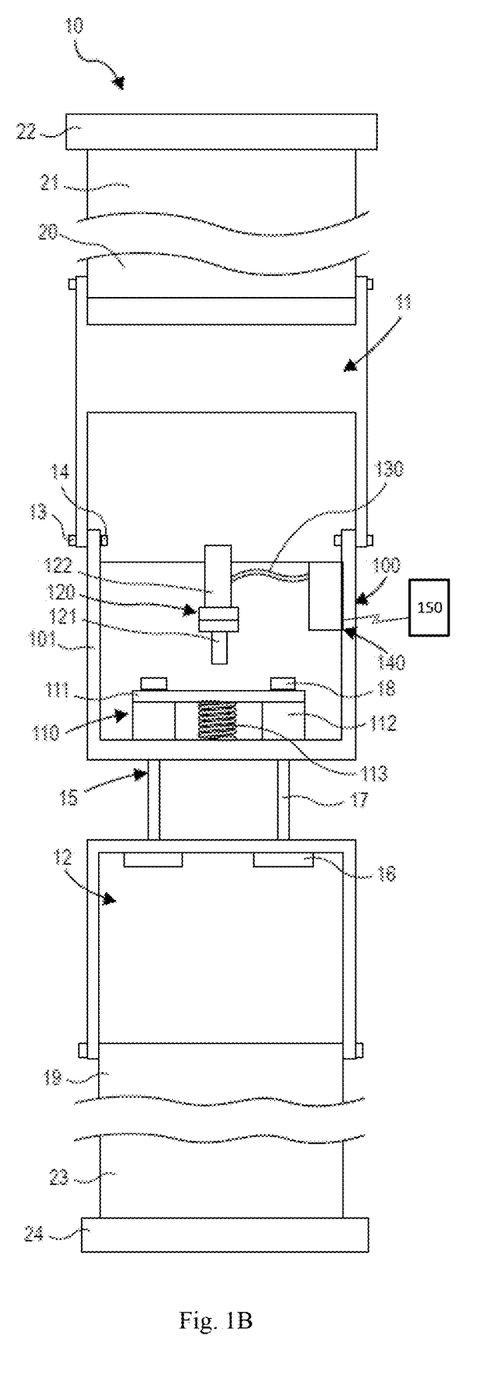
FIG. 1B depicts a simplified view of the tensioning system of FIG. 1A in an "on" position.

FIGS. 1A and 1B depict an example tensioning system 10 including a load transmission device 100 coupled between a first strap 19 and a second strap 20 of a strap assembly. The straps 19, 20 may be separate straps or may be separate ends of a single strap. The straps may be of any size and shape. In other embodiments, the tensioning system may include straps in addition, or instead of, the straps. As will be discussed below, FIG. 1A depicts the tensioning system 10 in an untensioned configuration where the strap assembly has less than a threshold amount of tension and FIG. 1B depicts the tensioning system 10 in a tensioned configuration where the strap assembly has greater than a threshold amount of tension. In some embodiments, the tensioning system 10 may include a bracket 11 coupling the load transmission device 100 to the second strap 20. More specifically, in some embodiments, the bracket 11 may function as a tensioning system 10 and may include such as, for example, a ratcheting mechanism that winds one or more of first and second straps 19, 20, respectively, around a shaft that is retained in place by one or more latches, a gripping mechanism that grips one or more of the first and second straps 19, 20 to retain tension in the straps until the gripping mechanism is released, or other suitable mechanism that can apply and retain tension in the first and second straps 19, 20. However, in other embodiments, there may be no bracket 11 where the tensioning mechanism is placed in a different location on tensioning system 10 (e.g., at one end of the tensioning system) and where the load transmission device 100 may be directly coupled to the second strap 20. The first strap 19 may be coupled to a first end of the load transmission device 100 via the bracket 11 and the second strap 20 may be coupled to a second end of the load transmission device 100 via the translating portion 12.

In some embodiments, the load transmission device 100 may be attached to a translating portion 12 where each of the load transmission device and the translating portions are coupled to respective straps 19, 20. For example, as shown in FIGS. 1A and 1B, the load transmission device 100 may be coupled to the second strap 20 and may include a tensioning mechanism for tensioning the strap assembly (e.g., a ratchet mechanism forming a part of the bracket 11). In other embodiments, the load transmission device 100 may not include the tensioning mechanism and, instead, the tensioning mechanism may be located on another portion of the tensioning system 10. Translating portion 12 may be coupled to an opposite strap 19. Accordingly, when the tensioning system 10 is tensioned (e.g., shown in FIG. 1B), the translating portion 12 may move away from load transmission device 100 (e.g., translate in a direction opposite of the load transmission device).

Each of the first and second straps 19, 20, respectively, may be coupled at respective ends to corresponding first and second fastening mechanisms 22, 24, respectively, (e.g., a hooking mechanism, clasp, or the like) for coupling to a product or structure. Specifically, the first strap 19 may be coupled to the first fastening mechanism 22 and the second strap 23 may be coupled to the second fastening mechanism 24. The first and second fastening mechanisms can be securely attached to a structure, etc. such that tensioning system 10 can secure cargo during transportation.

The load transmission device 100 may detect a tension between the bracket 11 and translating portion 12 (and, by extension, between the straps 19, 20) to determine an overall tension of the tensioning system 10. In some embodiments, the load transmission device 100 may be positioned adjacent the tensioning mechanism (e.g., ratcheting mechanism) to centralize the bulkiest components of the strap assembly at one location longitudinally along the strap assembly. However, in other embodiments, the load transmission device 100 may be positioned on any portion of the strap assembly, such as being directly connected at one or both ends of the straps 19, 20.

The load transmission device 100 may be coupled to the bracket 11 through fasteners 13 (e.g., a bolt, screw, nail, or the like) and nuts 14. Specifically, the fasteners 13 may be inserted through aligned apertures (not shown) on each end of the load transmission device.

The nut 14 may be coupled to the fastener 13 (e.g., through a threaded engagement) to couple the load transmission device 100 to the bracket 11. However, in other embodiments, the load transmission device 100 may be coupled to the bracket 11 through other suitable configurations (e.g., adhesive, welding, or the like).

The translating portion 12 may be coupled to load transmission device 100 through sliding fasteners 15. Specifically, each of the sliding fasteners 15 may include respective bottom heads 16, respective top heads 18, and respective shafts 17. The bottom and top heads 16, 18, respectively, may each have a prismoid shape, such as a cylindrical or rectangular prismoid. The bottom and top heads 16, 18, respectively, may include a diameter larger than the diameter of the shafts 17. The shafts 17 may have a smooth outer surface such that the shafts 17 may slide relative to other components (e.g., relative to the bases 112 and enclosure 101) of the tensioning system 10. The shafts 17 may be cylindrical, however, in other embodiments, the shafts 17 may have other prismoid shapes, such as being rectangular or the like.

The bottom head 16 may be coupled to the translating portion 12 (e.g., through welding or the like) such that movement of the translating portion 12 moves the bottom head 16. The bottom end of the shaft 17 may be received through apertures (not shown) defined along a top portion of the translating portion 12 and coupled to the bottom head 16 (e.g., through being coupled to the bottom head 16, welding, a threaded connection, or the like) such that movement of the bottom head 16 moves the shaft 17. The top head 18 may be similarly coupled to the top end of the shaft 17 such that movement of the shaft 17 moves the top head 18. In this manner, movement of the translating portion 12 moves the sliding fasteners 15 in unison.

The load transmission device 100 may include an enclosure 101 that houses a platform mechanism 110, a switch mechanism 120, one or more wires 130, and a transmitter 140. The transmitter 140 may house a battery to provide power the load transmission device 100. The enclosure 101 may be substantially cuboid, however, in other embodiments, the enclosure may have other prismoid shapes. The enclosure 101 may define holes (not shown) configured to receive the shafts 17. The holes may be smooth such that the shafts may slide in the holes.

The platform mechanism 110 may include a translating plate 111 and bases 112. The bases 112 may each be a hollow cylinder defining a channel (not shown). However, in other embodiments, the bases 112 may have other prismoid shapes. The channels may be configured to receive the shafts 17. Each channel may be smooth such that the shafts 17 may slide within the channels.

The plate 111 may be a monolithic metal strap, plate, or other suitable structure. The plate 111 may have a prismoid shape. For example, the plate 111 may be rectangular, however, in other embodiments, the plate 111 may be an oblong prismoid or have any other suitable prismoid shape. The plate 111 may define holes (not shown) configured to receive the shafts 17 (e.g., a corresponding prismoid shape to receive the shafts 17). The plate 111 may be coupled to the top heads 18 (e.g., through welding or the like). However, in other embodiments, the plate 111 may not be coupled to the top heads 18.

The platform mechanism 110 may include a spring 113, or other suitable deformable resilient member (e.g., deflectable metal strip). The ends of the spring 113 may be coupled to a bottom of the enclosure 101 and a bottom of the plate 111 (e.g., through welding, a retaining mechanism, or the like). The spring 113 may provide a spring force biasing the plate 111 toward the switch mechanism 120. The spring force may be a force sufficient to push the plate 111 to contact the switch mechanism 120 in the absence of a threshold opposing force (e.g., a threshold tension applied by the tensioning system 10, as will be discussed further below).

In some embodiments, movement of the translating portion 12 in a direction away from the bracket 11 (e.g., to tension the strap assembly) with a force strong enough to overcome the spring force of spring 113 may compress the spring 113 such that the shafts 17 slide through the bases 112 and enclosure 101 to cause the plate 111 to translate away from the switch mechanism 120. In this manner, tensioning the tensioning system 10 to greater than a threshold tension (e.g., to a tension force greater than a spring force of the spring 113) may move the plate 111 away from the switch mechanism 120. The maximum distance that the plate 111 may be moved away from the switch mechanism 120 (e.g., the plunger 121) may be determined by a height of the bases 112 as the bases 112 may act as a stop that prevents the plate 111 from moving away from the switch mechanism 120 any further.

The load transmission device 100 may include a transmitter 140 and one or more wires 130 connecting the transmitter 140 to the switch mechanism 120. The one or more wires 130 may allow for electronic communication between electronic components in the switch mechanism 120 with the transmitter 140. Although only one of the one or more wires 130 is depicted, in other embodiments, there may be more than one wire. The transmitter 140 may include one or more electronic components, such as a battery and a communication module (e.g., a wireless communications device) to send signals to a computing device regarding the status of the switch mechanism 120, as will be discussed further below.

The switch mechanism 120 may include a plunger 121 and a housing 122, however, in other embodiments any suitable type of switch mechanism 120 may be used including, but not limited to, a strain sensor, an electronic contact, proximity sensor, an optical sensor, etc. The housing 122 may include various electronic components that allow the switch mechanism 120 to function, as will be discussed further below. In some embodiments, the switch mechanism 120 may be a momentary switch such that engagement or disengagement of the switch mechanism 120 may be performed by moving the plunger 121. For the example embodiment described herein, the switch mechanism 120 will be engaged in an "on" position when the plunger 121 is extended to move away from the housing 122 (e.g., when the strap assembly is tensioned, as shown in FIG. 1B) and disengaged in an "off" position when the plunger 121 is depressed to move toward the housing 122 (e.g., when the strap assembly is untensioned, as shown in FIG. 1A). However, this example in no way limits the disclosed embodiments to this configuration.

The tensioning system 10 may include a computing device (not shown) that certain components of the tensioning system 10 (e.g., the transmitter 140) may be in electronic communication with. As shown in FIG. 1B, when the circuit is incomplete (e.g., when the plunger 121 is engaged in an "on" position), the switch mechanism 120 may communicate a signal via the transmitter 140 to a computing device (not shown in FIGS. 1A and 1B) in communication with the transmitter 140 notifying the computing device that the circuit is incomplete and that the strap assembly is sufficiently tensioned (e.g., that the strap assembly includes a tension greater than the spring force of the spring 113). As shown in FIG. 1A, when the circuit is complete (i.e., when the switch mechanism 120 is disengaged in an "off" position), the switch mechanism 120 may send a signal via the transmitter 140 to the computing device that the strap assembly is insufficiently tensioned (e.g., that the strap assembly includes a tension less than the spring force of the spring 113). Thus, the computing device can be notified when the tension in the strap assembly is above a threshold tension (e.g., sufficient to overcome the spring force of the spring 113) indicating the tension in the strap assembly is and when tension in the strap assembly is below the threshold tension (e.g., insufficient to overcome the spring force of the spring 113). In other embodiments, the switch mechanism 120 may not send a signal out to the computing device when the circuit is disconnected. Instead, the computing device may interpret the lack of notification from the switch mechanism 120 that the circuit is incomplete as indicating that the strap assembly is insufficiently tensioned. This may save energy for the switch mechanism 120 as the switch mechanism 120 would not send out as many signals.

In some embodiments, at least some of the electronic components that communicate the signal to the computing device are enclosed within the switch mechanism 120. In other embodiments, a battery and a wireless communications device (e.g., housed in the transmitter 140) are coupled to the switch mechanism 120, and the wireless communications device transmits information regarding the switch mechanism 120 (e.g., whether the switch mechanism is in the "on" or "off" position) to the computing device. The communication from the tensioning system 10 may be performed at any suitable time interval and may also be based upon any suitable action (for example, engagement or disengagement of switch mechanism 120, as explained in more detail below). The tensioning system 10 may send signals to the electronic device at any desired time interval. For example, the signals may be sent out once every minute, 10 minutes, 15 minutes, hour, or the like. The switch mechanism 120 may continually send such signals out via the transmitter 140 until the strap assembly is tightened and/or until the computing device is instructed to ignore the signals, as discussed further below.

Turning to FIG. 1A, when the tensioning system 10 is insufficiently tensioned, the plunger 121 may be depressed by the plate 111, thus disengaging the switch mechanism 120 to an "off" position. In this configuration, the switch mechanism 120 may send out a signal via the transmitter 140 to a computing device that the circuit is complete. The computing device may then notify a user that the strap assembly does not have enough tension. Turning to FIG. 1B, when the strap assembly is sufficiently tensioned, the plate 111 is translated away from plunger 121, thus engaging the switch mechanism 120 to an "on" position. In this configuration, the switch mechanism 120 may send out a signal via the transmitter 140 to a computing device that the circuit is incomplete. The computing device may then notify a user that the strap assembly has enough tension. However, in other embodiments, the switch mechanism may not send out a signal via the transmitter to a computing device when the switch mechanism is disengaged.

It should be understood that the distance between the plate 111 and the plunger 121 as shown in FIG. 1B is provided for illustrative purposes only. For example, in one embodiment, the switch mechanism 120 may send a signal to a computing device that the circuit is disconnected when the plate 111 is moved away from the switch mechanism 120 just enough to disengage with the switch mechanism 120. Moreover, it is understood that the distance the plunger 121 is depressed in FIG. 1A is provided for illustrative purposes only, and that the plunger 121 may be depressed when the plate 111 contacts the plunger 121 just enough to move the plunger 121.

The strap assembly may be sufficiently tensioned once a threshold amount of tension force is reached. In particular, this tension force may include tensioning the strap assembly with enough tension force to overcome the spring force of the spring 113. Thus, any suitable tension may be applied to the tensioning system 10 to disengage the switch mechanism 120 from the plate 111 as long as the tension is greater than the spring force of spring 113. Accordingly, the spring force of spring 113 may set the threshold tension such that a tension applied to the strap assembly that is less than the spring force is insufficient tension and a tension applied to the strap assembly that is greater than the spring force is sufficient tension.

The spring 113 may be chosen such that the spring force corresponds to the minimum required tension force to keep the products tightly packaged together by the strap assembly. For example, where the products require a minimum tension force of 40 pounds-force, the spring force may require 40 pounds-force to be compressed enough to move the plate 111 away from plunger 121. In this manner, the strap assembly may be sufficiently tensioned when the tension force is greater than 40 pounds-force (e.g., the tension force has overcome the spring force to move the plate 111 away from the switch mechanism 120). Continuing with this example, the strap assembly may be insufficiently tensioned when the tension force is less than 40 pounds-force (e.g., after the strap assembly has lost some tension force over time) such that the spring 113 pushes the plate 111 to engage the plunger 121, as shown in FIG. 1A. In some embodiments the spring force may be adjusted by a user by, for example, turning an adjustment screw that adjusts the spring force by moving the spring 113 and/or the switch mechanism 120.

In some embodiments, the switch mechanism 120 may be paired with the computing device through the transmitter 140 (e.g., via Zigbee™, radiofrequency, Bluetooth™ or any other suitable wireless communication protocol) at all times. In this example, completing the circuit of the switch mechanism 120 (e.g., engaging the plunger 121 when the strap assembly is in an un-tensioned configuration, as shown in FIG. 1A) completes a battery circuit to power the switch mechanism 120 so that the switch mechanism 120 and transmitter 140 may send out signals to the computing device. Further, engaging the plunger 121 may pair the switch mechanism 120 and transmitter 140 with, and send signals to, the computing device. Accordingly, in some embodiments the transmitter 140 may not be electrically connected (e.g., the battery may be disconnected from the circuit) until the tensioning system 10 loses tension, which turns on the switch mechanism 120 and couples the battery to the circuit so it transmits a signal to the computing device. This conserves the battery for the tensioning system 10 by only using power when there is insufficient tension for the strap assembly.

In some embodiments, the transmitter 140 may be powered on and off without regard to the engagement of the plunger 121. For example, the transmitter 140 may be powered on and off by a separate power switch (e.g., positioned on an exterior of the load transmission device 100 or wirelessly controlled by a computing device) to turn on or off the switch mechanism's 120 connection to the transmitter 140. In this manner, power may be conserved by turning off the strap assembly with the power switch when not in use and turning on the tensioning system 10 with the power switch only when the tensioning system 10 is used to secure cargo.

In a further embodiment, the transmitter 140 may be turned on when the strap assembly is sufficiently tensioned. For example, the switch mechanism 120 may be positioned underneath the plate 111 (e.g., within the spring 113) such that the plate 111 contacts the plunger 121 when the plate 111 is moved down. In this manner, the transmitter 140 may be automatically powered on when the strap assembly is sufficiently tensioned without the need for a separate power switch. In this example, the transmitter 140 may include a capacitor circuit such that, when the switch mechanism 120 is on (e.g., when the strap assembly is tensioned), the capacitor circuit is charged. In this manner, when the strap assembly loses tension and the switch mechanism 120 disconnects the battery from the circuit, the capacitor circuit may hold enough charge to power the wireless transmitter to send signals to the computing device when the tension is lost. The transmitter 140 may send signals for a period of time until the capacitor circuit loses its charge, such as for 30 minutes, 45 minutes, 2 hours or the like.

Although the foregoing tensioning system 10 has been discussed in the context of a strap assembly for use with securing cargo with a strap, features of the tensioning system may be used for other purposes. For example, a mechanism similar to platform mechanism 110 may be used to detect whether a trailer door is open and/or if a trailer is disconnected from a hitch (e.g., for horse trailers). For example, the switch mechanism 120 may be integrated within the trailer door latch and/or within the trailer hitch (on the trailer side and/or on the vehicle side). The transmitter 140 may be connected to the platform mechanism 110 and/or switch mechanism 120 to detect if a trailer door opens and/or if the trailer is disconnected from the hitch. As appreciated by one of skill in the art having the benefit of this disclosure, the tensioning and wireless transmission systems described herein are not limited to the embodiments described herein and may be employed in other applications without departing from the scope of this disclosure.

The foregoing tensioning system 10 may additionally be used in even further contexts. For example, the tensioning system 10 may be used in pool gates, tack rooms, horse-living quarters, horse-entry and exit doors, slant load dividers, generators, tripwire warning systems, truck bed covers, truck toolboxes, trailer tongue/latch systems, trailer ramps, recreational vehicle (RV) doors (e.g., RV storage doors), box truck doors, puck-up truck tailgate, truck box trailer doors, catalytic converters, motorcycle kickstand, entry gates, vehicle driveway gates, livestock trailer doors, shipping containers, yard barns, motorcycles, door locks, fire alarm, home security systems, drone monitoring, bicycle security/locks, drawer locks, desk locks, or cabinet locks.

Figure 2:
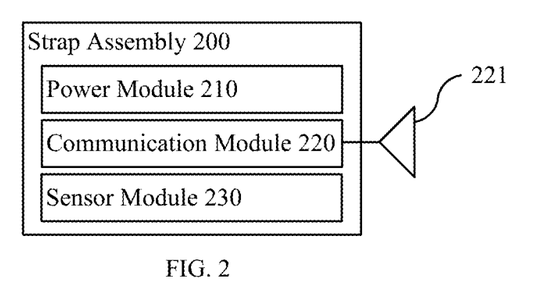
FIG. 2 depicts a schematic view of an example strap assembly according to one embodiment of the disclosure.

As noted above, the load transmission device 100 may include electronic components in one or both of the switch mechanism 120 and transmitter 140. For example, FIG. 2 depicts an example schematic of the electronic components of a strap assembly 200, which may be similar to the load transmission device 100, including a power module 210, communication module 220, and a sensor module 230. In other embodiments, the strap assembly 200 may include other components or functionality than discussed, or may include components combined into fewer or more components without departing from the scope of the present application.

The power module 210 may provide power to the strap assembly 200. For example, the power module 210 may be a battery that powers the strap assembly 200 through a battery circuit. The battery may be any suitable battery, including a rechargeable battery, such as for example a lithium battery, (e.g., a 2032 lithium battery). In some embodiments, the battery may be recharged by a charging apparatus 150 (e.g., apparatus that charges the battery via vibration and/or solar). For example, the battery may be recharged as the strap assembly 200 is transported (e.g., by harvesting generated by the strap assembly 200 vibrating during transportation or storing the energy received from the sun using one or more solar panels). The battery may have any suitable voltage, such as 1.7 volts. The power module 210 may additionally or alternatively include a capacitor circuit capable of storing a charge. The capacitor circuit may work in tandem with a battery circuit such that the capacitor circuit is charged when the battery circuit is turned on and the capacitor circuit may provide the strap assembly 200 power for a period of time after the battery circuit turns off. In a yet further alternative, there is no battery circuit and only the capacitor circuit is used.

The communication module 220 may communicate with other devices and systems. The communication module 220 may include a wireless transceiver 221 to communicate with other devices (such as a wireless transceiver of a computing device) or servers. Alternatively, the communication module 220 may include a wired transceiver in addition to or in place of the wireless transceiver. The strap assembly 200 may communicate with other remote devices or servers via the communication module 220 using various configurations and protocols, including short range communication protocols such as near-field communication, Bluetooth™, Bluetooth™ Low Energy (BLE), any suitable radio frequency (RF) communications system, or ad-hoc networks, the Internet, intranets, virtual private networks, wide area networks, local networks, private networks using communication protocols proprietary to one or more companies, Ethernet, WiFi and HTTP, and combinations of the foregoing.

The sensor module 230 may include one or more sensors. For example, the sensor module 230 may include metric sensors (e.g., an accelerometer, gyroscope, or the like). The sensor module 230 may additionally or alternatively include sensors to determine whether sufficient tension is being applied to the strap assembly 200. For example, the sensor module 230 may include a momentary switch (e.g., the switch mechanism 120) including a plunger, a proximity sensor, an optical sensor, and the like. The position of the plunger may determine whether the momentary switch is activated.

Figure 3:
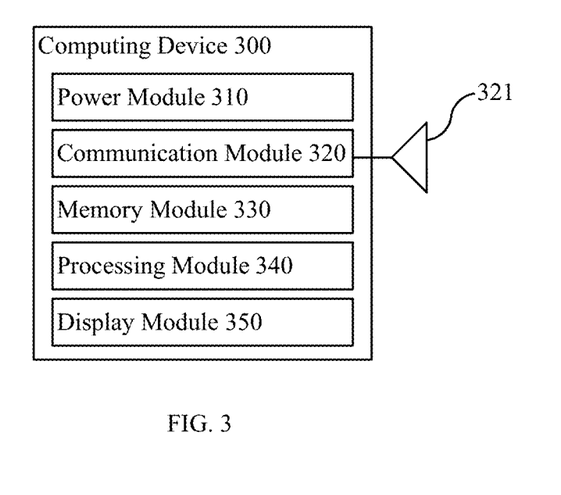
FIG. 3 depicts a schematic view of an example computing device according to one embodiment of the disclosure.

FIG. 3 depicts an example computing device 300, such as a user device (e.g., portable electronic device, cellular phone, pager, etc.). The computing device may be configured to receive wireless communications from strap assembly 200 and indicate to a user if the strap is above or below the threshold tension. In some embodiments computing device may emit an audible alarm when tension in the strap is less than the threshold tension. In further embodiments, the computing device 300 may receive wireless communications from a plurality of strap assemblies 200 so one user can monitor tension for multiple strap assemblies. In some embodiments, the computing device 300 may be rechargeable and may be configured to be recharged by a 12 Volt DC power source in a vehicle and/or a 110 Volt AC residential power source.

In various embodiments, the computing device may be portable. For example, the computing device may be positioned within a vehicle, positioned within a residence, etc. while maintaining the ability to receive communications from one or more strap assemblies 200. For example, in one embodiment, the computing device 300 can be charged by a vehicle during transportation of the cargo, disconnected from the vehicle power source, and remotely operated by the operator to continuously monitor the tension in multiple strap assemblies 200. Thus, not only can the computing device 300 detect a strap that is accidentally loosened, but the computing device can also detect potential theft of the cargo by intentional unauthorized loosening of one or more strap assemblies 200. Computing device 300 may be configured to emit one or more visible and/or audible alarms, and/or may be configured to communicate with another computing device (e.g., cellular phone) to notify an operator of the change in status of one or more strap assemblies 200.

The computing device 300 may include a power module 310, communication module 320 (for receiving and/or transmitting), memory module 330, processing module 340, and display module 350. Although FIG. 3 functionally illustrates the processing module 340, memory module 330, and other elements of the computing device 300 as being within the same overall block, such components may or may not be stored within the same physical housing. The power module 310 may be similar to the power module 210, described above. In some embodiments, the communication module 320 may be similar to the communication module 220. The communication module 320 may include a wireless transceiver 321 in communication with the wireless transceiver 221 of the strap assembly 200.

The memory module 330 may be configured to store instructions and data. For example, such instructions may include providing a notification to a user regarding the tension of a strap assembly based on whether a signal is received from a switch mechanism. The memory module 330 may include, for example, flash memory and/or NVRAM, and may be embodied as a hard-drive or memory card. Alternatively, the memory module 330 may also include DVDs, CD-ROMs, high-density tape drives, and other types of write-capable or read-only memories. In one implementation, a computer program product is tangibly embodied in an information carrier. The information carrier may be a computer- or machine-readable medium, such as memory module 330.

The instructions may be any set of instructions to be executed directly, through machine code or the like, indirectly, through scripts or the like, by the processor(s). The instructions may be stored in object code format for direct processing by the processor(s), or in any other computing device language including scripts or collections of independent source code modules that are interpreted on demand or compiled in advance. The data may be retrieved, stored, or modified by the processors in accordance with the instructions.

The processing module 340 may include one or more computer processors such as a central processing unit and/or graphics processors, as well as memory module configured to store instructions and data. The processors may or may not operate in parallel, and may include ASICs, controllers, and other types of hardware circuitry.

The display module 350 may comprise appropriate circuitry for driving the display device to present graphical and other information to the user. By way of example, the display module 350 may display a notification regarding whether the strap assembly is sufficiently tensioned or not. In some embodiment, the computing device 300 may include a speaker or other audible device configured to emit a warning sound to a user upon loss of tension in the straps.

Different arrangements of the components depicted in the drawings or described above, as well as components and steps not shown or described are possible. Similarly, some features and sub-combinations are useful and may be employed without reference to other features and sub-combinations. Embodiments of the present application have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the present application, a single component may be replaced by multiple components, and multiple components may be replaced by a single component, to provide an element or structure or to perform a given function or functions. Except where such substitution would not be operative to practice certain embodiments of the present application, such substitution is considered within the scope of the present application.

It is to be understood that the figures and descriptions of embodiments of the present application have been simplified to illustrate elements that are relevant for a clear understanding of the present application. Those of ordinary skill in the art will recognize, however, that these and other elements may be desirable. However, because such elements are well known in the art, and because they do not facilitate a better understanding of the present application, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present application, a single component may be replaced by multiple components, and multiple components may be replaced by a single component, to provide an element or structure or to perform a given function or functions. Except where such substitution would not be operative to practice certain embodiments of the present application, such substitution is considered within the scope of the present application.

The examples presented herein are intended to illustrate potential and specific implementations of the present application. It can be appreciated that the examples are intended primarily for purposes of illustration of the present application for those skilled in the art. There may be variations to these diagrams or the operations described herein without departing from the spirit of the present application. For instance, in certain cases, method steps or operations may be performed or executed in differing order, or operations may be added, deleted, or modified.

Furthermore, whereas particular embodiments of the present application have been described herein for the purpose of illustrating the present application and not for the purpose of limiting the same, it will be appreciated by those of ordinary skill in the art that numerous variations of the details, materials and arrangement of elements, steps, structures, and/or parts may be made within the principle and scope of the present application without departing from the present application as described in the claims.

All patents, patent publications, patent applications, journal articles, books, technical references, and the like discussed in the instant disclosure are incorporated herein by reference in their entirety for all purposes.

The invention claimed is:

1. A strap system comprising:
   a first strap extending between a first end and a second end, the first end connected to a first attachment mechanism;
   a second strap extending between a third end and a fourth end, the fourth end connected to a second attachment mechanism; and
   a load transmission device connected to the second end of the first strap and to the third end of the second strap, wherein the load transmission device includes:
   an enclosure having a base portion;
   first and second stops affixed to the base portion;
   a first shaft extending through the base portion and through the first stop;

a second shaft extending through the base portion and through the second stop;

a plate positioned within the enclosure and coupled to the first and second shafts, the plate arranged to translate unidirectionally via translation of the first and second shafts through the base portion and through the first and second stops;

a unitary switch positioned within the housing and having an on state and an off state;

a spring arranged to apply a spring force biasing the plate towards the unitary switch;

wherein, when a tension force between the first strap and the second strap is less than a first threshold tension force, the spring forces the plate to translate via the first and second shafts to contact the unitary switch such that the unitary switch is retained in the off state causing the load transmission device to transmit a signal; and wherein, when the tension force between the first strap and the second strap is greater than, or equal to, a second threshold force, the plate is in contact with the first and second stops such that a gap is defined between the unitary switch and the plate, and wherein the unitary switch is retained in the on state.

2. The strap system of claim 1, wherein the unitary switch is arranged to change from the on state to the off state when the tension force in the first and second straps falls below the threshold force.

3. The strap system of claim 2, wherein:

the load transmission device includes a power storage device and a wireless transmitter; and the power storage device supplies power to the wireless transmitter to transmit the signal in response to the switch changing state.

4. The strap system of claim 3, further comprising a charging apparatus that charges the power storage device.

5. The strap system of claim 1, wherein the load transmission device includes an adjustment mechanism spring arranged to control the threshold force.

6. The strap system of claim 1, wherein:

the signal is a first signal transmitted in response to the unitary switch entering the off state; and the load transmission device transmits a second signal in response to the unitary switch entering the on state.

7. The strap system of claim 6, further comprising a computing device arranged to receive the first and second signals and to display a corresponding status of the load transmission device.

8. The strap system of claim 1, further comprises a strap tensioning mechanism that applies and releases tension in the first and second straps.

9. A tensioning system, comprising:

a strap apparatus; and a load transmission device coupled to the strap apparatus and including:

an enclosure having a base portion;

first and second stops affixed to the base portion;

a first shaft extending through the base portion and through the first stop;

a second shaft extending through the base portion and through the second stop;

a plate positioned within the enclosure and coupled to the first and second shafts, the plate arranged to translate unidirectionally via translation of the first and second shafts through the base portion and through the first and second stops;

a unitary switch having an on state and an off state;

a spring arranged to apply a spring force biasing the plate towards the unitary switch;

wherein, when a tension force in the strap apparatus is less than a first threshold tension force, the spring force forces the plate to translate via the first and second shafts to retain the unitary switch in an on state; and when the tension force in the strap apparatus is greater than a second threshold tension force, the tension force forces the plate away from the unitary switch such that the unitary switch is retained in an off state for all tension forces greater than the second threshold tension force.

10. The tensioning system of claim 9, wherein the load transmission device further comprises a transmitter arranged to transmit a first signal when the unitary switch is in the on state and to transmit a second signal when the switch mechanism is in the off state.

11. The tensioning system of claim 10, further comprising a computing device arranged to receive the first and second signals and to display a corresponding status of the load transmission device.

12. The tensioning system of claim 9, wherein the strap apparatus includes a first and a second strap each attached to the load transmission device.

13. The tensioning system of claim 9, further comprising a strap tensioning mechanism that applies and releases tension in the strap apparatus.

14. A method of monitoring tension in a strap apparatus, the method comprising:

attaching the strap apparatus to a structure, wherein the strap apparatus includes a load transmission device comprising:

an enclosure having a base portion;

first and second stops affixed to the base portion;

a first shaft extending through the base portion and through the first stop;

a second shaft extending through the base portion and through the second stop;

a plate positioned within the enclosure and coupled to the first and second shafts, the plate arranged to translate unidirectionally via translation of the first and second shafts through the base portion and through the first and second stops;

a unitary switch having an on state and an off state; and a spring arranged to apply a spring force biasing the plate towards the unitary switch;

applying a tension force to the strap apparatus via a tensioning mechanism;

when the tension force is less than a threshold tension force:

retaining the unitary switch in the on state via the plate that translates via the first and second shafts; and transmitting a first signal from the unitary switch in response to the tension force;

when the tension force is greater than, or equal to, the threshold tension force:

retaining the unitary switch in the off state via the plate that translates via the first and second shafts; and transmitting a second signal from the unitary switch in response to the tension force.

15. The method of claim 14, further comprising receiving by a computing device the first and the second signals and displaying a corresponding status of the tension in the strap apparatus.

16. The method of claim 14, wherein the load transmission device further comprises a transmitter arranged to transmit the first signal when the switch mechanism is in the on state and to transmit the second signal when the unitary switch is in the off state.

17. The method of claim 14, wherein the strap apparatus further comprises a strap tensioning mechanism that applies and releases tension in the one or more straps.

* * * * *